(12) United States Patent
Cvijetic et al.

(10) Patent No.: US 8,615,171 B2
(45) Date of Patent: Dec. 24, 2013

(54) COMPUTATIONALLY-EFFICIENT EQUALIZATION IN POLMUX OFDM TRANSMISSION WITH DIRECT DETECTION VIA JOINT TRANSMITTER AND RECEIVER PROCESSING

(75) Inventors: Neda Cvijetic, Princeton, NJ (US); Narayan Prasad, Princeton, NJ (US); Dayou Qian, Princeton, NJ (US); Ting Wang, Princeton, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 203 days.

(21) Appl. No.: 13/077,748

(22) Filed: Mar. 31, 2011

(65) Prior Publication Data
US 2012/0251110 A1    Oct. 4, 2012

(51) Int. Cl.
*H04B 10/00* (2013.01)
(52) U.S. Cl.
USPC .......................................... 398/158; 398/159
(58) Field of Classification Search
USPC ................................. 398/158–161
See application file for complete search history.

(56) References Cited

U.S. PATENT DOCUMENTS

| | | | | |
|---|---|---|---|---|
| 7,623,797 B2* | 11/2009 | Crivelli et al. | ............... | 398/208 |
| 8,041,233 B2* | 10/2011 | Hueda et al. | ................. | 398/208 |
| 8,116,367 B2* | 2/2012 | Carrer et al. | ................. | 375/233 |
| 8,184,973 B2* | 5/2012 | Qian et al. | ...................... | 398/65 |
| 8,204,377 B2* | 6/2012 | Liu et al. | ......................... | 398/65 |
| 8,218,614 B2* | 7/2012 | Chen et al. | .................... | 375/232 |
| 8,218,979 B2* | 7/2012 | Liu | ............................. | 398/208 |
| 8,457,504 B2* | 6/2013 | Hueda et al. | ................. | 398/208 |
| 8,472,813 B2* | 6/2013 | Cvijetic et al. | ............... | 398/205 |
| 2009/0202243 A1* | 8/2009 | Qian et al. | ..................... | 398/65 |
| 2010/0086303 A1* | 4/2010 | Qian et al. | ..................... | 398/65 |
| 2010/0104284 A1* | 4/2010 | Liu et al. | ........................ | 398/65 |
| 2010/0178057 A1* | 7/2010 | Shieh | ............................. | 398/79 |
| 2010/0329683 A1* | 12/2010 | Liu | ............................... | 398/81 |
| 2011/0206375 A1* | 8/2011 | Xiong et al. | .................... | 398/65 |
| 2011/0310951 A1* | 12/2011 | Cvijetic et al. | ............... | 375/233 |
| 2012/0020405 A1* | 1/2012 | Chen et al. | .................... | 375/232 |
| 2012/0106615 A1* | 5/2012 | Carrer et al. | ................... | 375/231 |
| 2012/0251110 A1* | 10/2012 | Cvijetic et al. | ................ | 398/65 |
| 2012/0263467 A1* | 10/2012 | Cvijetic et al. | ................ | 398/65 |

* cited by examiner

*Primary Examiner* — Agustin Bello
(74) *Attorney, Agent, or Firm* — Joseph Kolodka

(57) ABSTRACT

A method for joint transmitter and receiver processing for computationally efficient equalization in polarization multiplexed (POLMUX) optical orthogonal frequency division multiplexed (OFDM) transmission with direct detection.

29 Claims, 7 Drawing Sheets

COMPUTATIONALLY-EFFICIENT EQUALIZATION IN POLMUX OFDM TRANSMISSION WITH DIRECT DETECTION VIA JOINT TRANSMITTER AND RECEIVER PROCESSING

FIELD OF DISCLOSURE

This disclosure relates to the field of optical communications and in particular to a method for joint transmitter and receiver processing for computationally efficient equalization in high-speed polarization multiplexed (POLMUX) optical orthogonal frequency division multiplexed (OFDM) transmission with direct detection.

BACKGROUND OF DISCLOSURE

It is anticipated that the transport capacity of next-generation optical access/metro networks (<600 km) will migrate to 40-Gb/s or 100-Gb/s per channel in the near future due—in part—to the proliferation of video traffic. However, unlike high-speed long-haul systems (1000$^+$ km) that can offset high technological implementation costs, it is essential that technologies employed in next-generation optical access/metro networks be both highly flexible and cost-efficient.

As a result of its high spectral efficiency, resilience to linear dispersion, and efficient digital signal processing (DSP)-based implementation, optical orthogonal frequency division multiplexing (OFDM) has emerged as an attractive candidate for next-generation fiber-optic systems. Moreover, optical OFDM-based Multiple Access (OFDMA) is particularly attractive for next-generation optical access/metro systems due to its application transparency and bandwidth flexibility.

Polarization-multiplexed (POLMUX) OFDM transmission with direct (non-coherent) detection has been shown to further increase spectral efficiency at ultra high-speeds while advantageously requiring a reduced optical receiver complexity and cost. By achieving record 40$^+$ Gb/s data rates with simplified optical receivers, POLMUX-OFDMA with direct detection (DD) is a highly-promising technology for future fiber-based access/metro systems.

However, while POLMUX-OFDM-DD systems reduce receiver complexity compared to coherent receivers, they also increase the complexity of the required post-photodetection electronic digital signal processing (DSP). More particularly—and due to direct detection—cross-polarization interference will occur in the optical receiver, which must be corrected, or equalized, in post-photodetection DSP. Operationally, this DSP-based equalization requires both the computation of a 4×4 matrix inverse and the multiplication of incoming data with the inverted matrix (i.e. data equalization). Consequently, both of these steps can prohibitively increase DSP receiver complexity and, if performed in a sub-optimal way, can also enhance noise effects.

Previously, we have proposed receiver-end processing algorithms that can notably reduce the complexity of the 4×4 matrix inverse computation. However, the computational complexity of the equalization step remained unchanged. Since the equalization step must be performed significantly more often than the required matrix inversion, it subsequently became a limiting factor in overall computational complexity. Moreover, in our previous work, the equalization step was performed sub-optimally with respect to theoretically-optimal maximum likelihood (ML) equalization, which can enhance noise effects and degrade the bit error rate (BER) of the system. Consequently, a processing algorithm that enables computationally-efficient ML equalization and reduces overall complexity would represent a significant advancement in the art as it pertains to high-speed, real-time POLMUX-OFDM-DD systems.

SUMMARY OF DISCLOSURE

An advance is made in the art according to an aspect of the present disclosure directed to a method for joint transmitter and receiver processing to achieve computationally efficient as well as maximum likelihood (ML) equalization in polarization multiplexed (POLMUX) orthogonal frequency division multiplexed (OFDM) transmission with direct detection.

Accordingly, the present disclosure is directed to joint transmitter and receiver-end digital signal processing methods for POLMUX-OFDM-DD systems which exploiting variants of a fundamental block-symmetric (B-S) structure in the channel estimation matrix that is used in equalizing cross-polarization interference. Specifically, the method enables: i.) theoretically-optimal maximum likelihood (ML) equalization or optimized linear equalization with minimal computational complexity; ii.) two- and four-fold potential increases in reliability, as measured by the achievable diversity order; and iii.) full channel state information feedback with minimal overhead. Advantageously, each of these advantages can be exploited in high-speed, real-time POLMUX-OFDM-DD applications, such as OFDMA passive optical networks (PON).

Advantageously, the method according to the present disclosure maintains spectral and cost efficiency of contemporary POLMUX-OFDM-DD systems, while both enabling theoretically-optimal maximum likelihood (ML) equalization with reduced computational complexity and increased reliability in high-speed (40$^+$ Gb/s), real-time applications.

BRIEF DESCRIPTION OF THE DRAWING

A more complete understanding of the disclosure may be realized by reference to the accompanying drawing in which.

DESCRIPTION OF EMBODIMENTS

Figure 1:
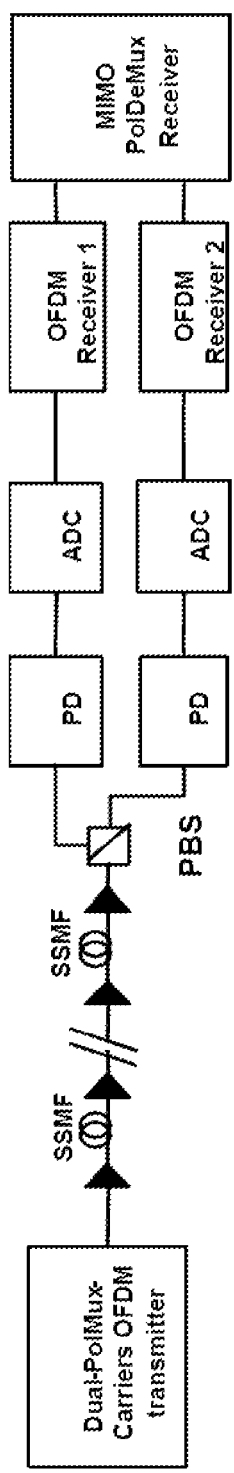
FIG. 1 is a schematic block diagram depicting a contemporary prior-art POLMUX-OFDM-DD system.

The following merely illustrates the principles of the various embodiments. It will thus be appreciated that those skilled in the art will be able to devise various arrangements which, although not explicitly described or shown herein, embody the principles of the embodiments and are included within their spirit and scope.

Furthermore, all examples and conditional language recited herein are principally intended expressly to be only for pedagogical purposes to aid the reader in understanding the principles of the embodiments and the concepts contributed by the inventor(s) to furthering the art, and are to be construed as being without limitation to such specifically recited examples and conditions.

Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams herein represent conceptual views of illustrative circuitry embodying the principles of the invention. Similarly, it will be appreciated that any flow charts, flow diagrams, state transition diagrams, pseudocode, and the like represent various processes which may be substantially represented in computer readable medium and so executed by a computer or processor, whether or not such computer or processor is explicitly shown.

The functions of the various elements shown in the FIGs., including any functional blocks labeled as "processors" may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, read-only memory (ROM) for storing software, random access memory (RAM), and non-volatile storage. Other hardware, conventional and/or custom, may also be included. Similarly, any switches shown in the FIGs. are conceptual only. Their function may be carried out through the operation of program logic, through dedicated logic, through the interaction of program control and dedicated logic, or even manually, the particular technique being selectable by the implementer as more specifically understood from the context.

In the claims hereof any element expressed as a means for performing a specified function is intended to encompass any way of performing that function including, for example, a) a combination of circuit elements which performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. Applicants thus regard any means which can provide those functionalities as equivalent as those shown herein.

Unless otherwise explicitly specified herein, the drawings are not drawn to scale.

By way of some additional background and turning now to FIG. 1 showing a contemporary POLMUX-DD-OFDM system. In FIG. 1, a POLMUX-OFDM signal is generated in a Dual-PolMux OFDM transmitter and transmitted over standard single mode fiber (SSMF). At a receiver, the POLMUX-OFDM signal is split into two components by a polarization beam splitter (PBS) and direct-detected by two photo-diodes (PD). After analog-to-digital conversion (ADC), each component is processed by an OFDM receiver, and sent to the MIMO PolDeMux receiver. The DSP-based PolDeMux receiver equalizes any cross-polarization interference which occurs during photodetection. Specifically, using the output of the OFDM receivers, the PolDeMux receiver obtains the following channel estimate in matrix form, wherein for simplicity we have assumed no additive noise:

$$\underbrace{\begin{bmatrix} c_{X,ch1}a_{11} & c_{Y,ch1}b_{21} & c_{Y,ch1}b_{11} & c_{X,ch1}a_{21} \\ c_{Y,ch1}a_{11} & c_{X,ch1}b_{21} & c_{X,ch1}b_{11} & c_{Y,ch1}a_{21} \\ c_{X,ch2}a_{12} & c_{Y,ch2}b_{22} & c_{Y,ch2}b_{12} & c_{X,ch2}a_{22} \\ c_{Y,ch2}a_{12} & c_{X,ch2}b_{22} & c_{X,ch2}b_{12} & c_{Y,ch2}a_{22} \end{bmatrix}}_{PolMux\ channel\ estimation\ matrix} \times \underbrace{\begin{bmatrix} X_i \\ X_{n-i+1} \\ Y_i \\ Y_{n-i+1} \end{bmatrix}}_{Tx\ signals} = \underbrace{\begin{bmatrix} X'_i \\ X'_{n-i+1} \\ Y'_i \\ Y'_{n-i+1} \end{bmatrix}}_{Re\ signals} \quad [1]$$

In the PolMux channel estimation matrix shown in [1] above, the coefficients a and b represent power splitting ratios caused by polarization rotation, and c is determined by a power difference between the optical carrier and the OFDM signal. Moreover, no matrix structure is apparent from the PolMux matrix formulation shown above. Next, the PolDeMux receiver shown in FIG. 1 computes the inverse of the channel estimation matrix, i.e. the PolDeMux matrix, and performs the equalization by directly multiplying the inverse matrix with the received (Re) signals. This multiplication step is also known as zero forcing (ZF) equalization. It is also noted that no matrix structure is apparent from the PolDeMux matrix formulation of [2].

$$\underbrace{\begin{bmatrix} c_{X,ch1}a_{11} & c_{Y,ch1}b_{21} & c_{Y,ch1}b_{11} & c_{X,ch1}a_{21} \\ c_{Y,ch1}a_{11} & c_{X,ch1}b_{21} & c_{X,ch1}b_{11} & c_{Y,ch1}a_{21} \\ c_{X,ch2}a_{12} & c_{Y,ch2}b_{22} & c_{Y,ch2}b_{12} & c_{X,ch2}a_{22} \\ c_{Y,ch2}a_{12} & c_{X,ch2}b_{22} & c_{X,ch2}b_{12} & c_{Y,ch2}a_{22} \end{bmatrix}}_{PolDeMux\ matrix} \times \underbrace{\begin{bmatrix} X'_i \\ X'_{n-i+1} \\ Y'_i \\ Y'_{n-i+1} \end{bmatrix}}_{Re\ signals} = \underbrace{\begin{bmatrix} X_i \\ X_{n-i+1} \\ Y_i \\ Y_{n-i+1} \end{bmatrix}}_{Tx\ signals} \quad [2]$$

For a M×M=4×4 matrix with no apparent structure, a single PolDeMux matrix computation via direct inversion of the channel estimation matrix shown in [2] would significantly increase the computational complexity while the equalization based on ZF as in [1] would degrade performance by enhancing noise effects. As noted previously in our U.S. patent application Ser. No. 12/818,154 filed Jun. 18, 2010 and subsequent publications (See, e.g., N. Cvijetic et al, COMPUTATIONALLY-EFFICIENT DSP-BASED MIMO EQUALIZATION FOR OSNR GAINS IN 40 Gb/s OFDMA-PON and N. Cvijetic et al, BLOCK DIAGONAL MIMO EQUALIZATION FOR POLARIZATION MULTIPLEXED OFDM TRANSMISSION WITH DIRECT DETECTION), we described a method to reduce the complexity of PolDeMux matrix computation. However, the complexity of the equalization step was not addressed. Moreover, processing algorithms for improving reliability (as measured by the diversity order) were also not addressed. Finally, the additional overhead for full channel state information feedback was not addressed by our earlier attempts.

A somewhat different POLMUX-OFDM-DD system was suggested which partially solves the cross-polarization interference problem through optical rather than electronic processing. More particularly—at the receiver—the POLMUX- OFDM signal is split into two components, and a sharp optical filter is used to remove the carrier in one polarization. However, this approach increases the optical receiver complexity, incurs a prohibitive 10+ dB penalty in the required optical signal to noise ratio (OSNR), only works over a small range of polarization rotation angles, and also proposes no mechanism for improving reliability.

According to the present disclosure, methods for a joint transmitter and receiver-end processing for POLMUX-OFDM-DD systems solve these problems by recognizing and exploiting variants of a fundamental block-symmetric (B-S) structure in the channel estimation matrix that is used in equalizing cross-polarization interference. Specifically, the proposed algorithms enable: i.) theoretically-optimal maximum likelihood (ML) equalization with much reduced computational complexity; ii.) two- and four-fold potential increases in reliability, as measured by the achievable diversity order; and iii.) full channel state information feedback with minimal overhead. Each of these advantages can be exploited in high-speed, real-time POLMUX-OFDM-DD applications, such as OFDMA-PON.

Advantageously, our method maintains spectral and cost efficiency of the contemporary POLMUX-OFDM-DD system such as that depicted in FIG. 1, while both enabling theoretically-optimal maximum likelihood (ML) equalization with minimal computational complexity and increasing reliability in high-speed (40+ Gb/s), real-time applications.

Figure 2:
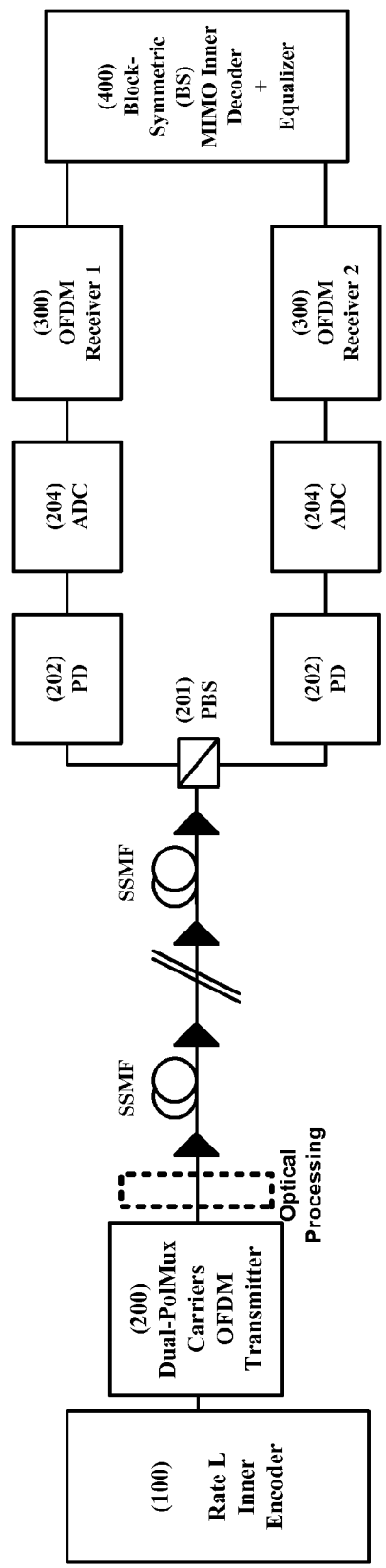
FIG. 2 is a schematic block diagram depicting a POLMUX-DD-OFDM system with transmitter-end inner encoder and a computationally efficient block symmetric multiple input multiple output (MIMO) inner decoder and equalizer according to an aspect of the present disclosure.

Turning now to FIG. 2, which is a schematic block diagram depicting a POLMUX-DD-OFDM system with transmitter-end inner encoder and a computationally efficient block symmetric MIMO inner decoder and equalizer according to an aspect of the present disclosure, an Inner Encoder (100) exhibiting rate L performs transmitter-end data processing and formats incoming data symbols for reliable transmission. From the output of the inner encoder (100), an optical POLMUX-OFDM signal is generated in a Dual-PolMux-Carriers transmitter (110) and then transmitted through SSMF and optical amplifiers. As may be appreciated by those skilled in the art, the POLMUX-OFDM signal is impaired by both optical dispersion and amplifier noise during transmission, and experiences random polarization rotation which can result in cross-polarization interference.

Shown further in that FIG. 2 is a dotted-line-box which may optionally provide a variety of known optical processing on the transmitted optical signals such as dispersion compensation through dispersion compensating fiber (DCF), etc. Such optional optical processing is not required for the practice of the method of the present disclosure, but can provide important benefits, and is thus explicitly shown in FIG. 2.

At the receiver side, the POLMUX-OFDM signal is separated by a Polarization Beam Splitter—PBS (201), wherein two PBS (201) outputs are photodetected by two photodetectors (PDs) (202) and digitized by two parallel analog-to-digital converters (ADCs) (204). The photodetection (202) and ADC processes (204) introduce additional noise into the received signal.

The OFDM receivers (300) down-convert the electrical radio frequency (RF) OFDM signal to baseband and perform digital in-phase/quadrature (I/Q) demultiplexing. The OFDM receivers (300) output frequency-domain data signals containing the cross-polarization interference and noise to the Block-Symmetric (B-S) MIMO Inner Decoder and Equalizer (400), which separates the data in each polarization in a way that realizes theoretically-optimal ML equalization and/or optimized linear equalization with much reduced computational complexity, and also achieves a potential increase in reliability (i.e. diversity order). The operational details of this system depicted in FIG. 2 are described below.

Figure 3:
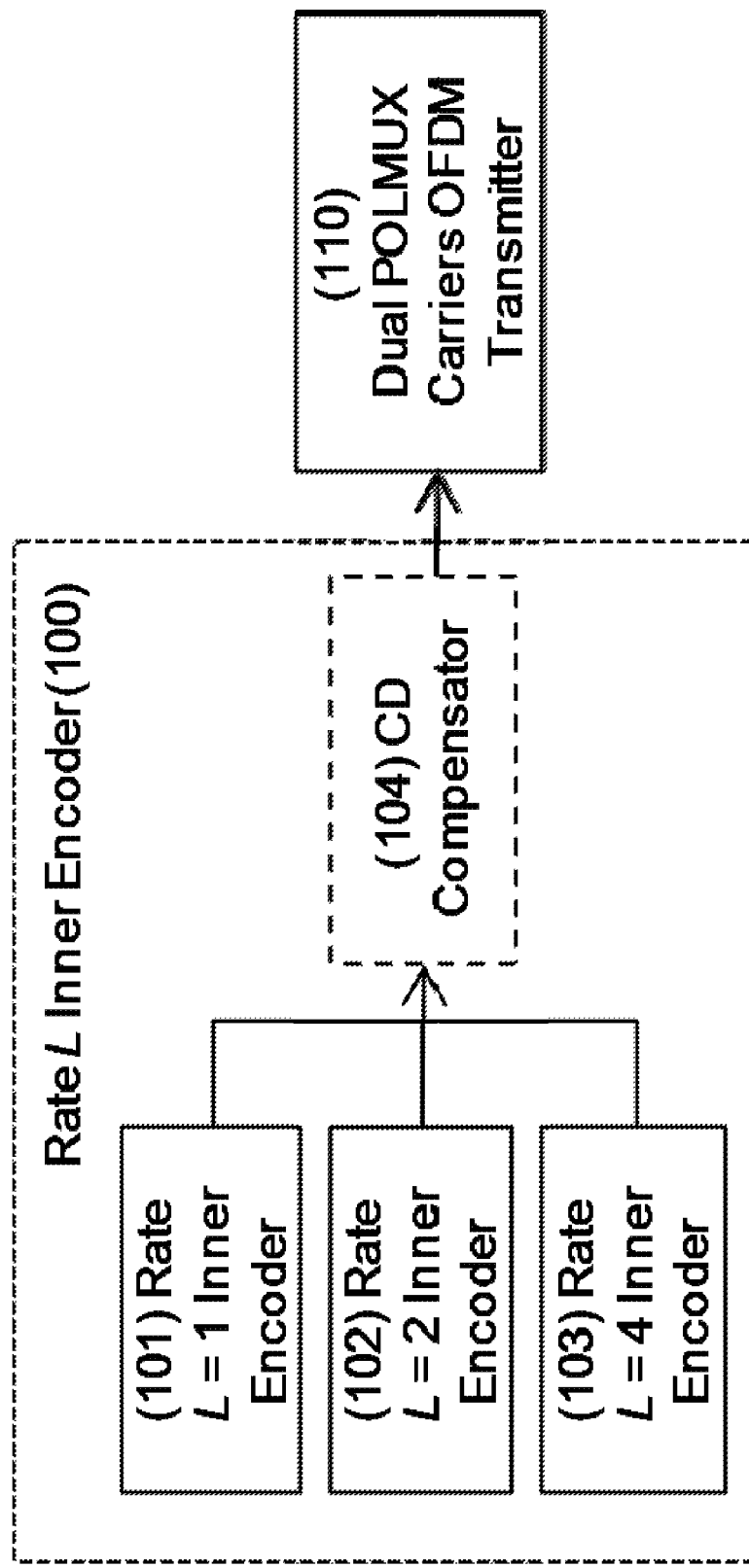
FIG. 3 is a schematic block diagram depicting the operation of an inner encoder according to an aspect of the present disclosure.

With reference now to FIG. 3, there it shows a detailed architecture of the Rate L inner encoder (100). Namely, an inner code design exhibiting variable rate L=1, 2, 4 is first used to process incoming data, which are assumed to be complex symbols from a quadrature amplitude modulated (QAM) constellation. Following rate L encoding, the optional step of chromatic dispersion (CD) compensation can be performed. More specifically, a CD compensator (104) pre-computes the deterministic CD-induced phase shift that will be exerted on the signal during transmission, using well-known formulas, and compensates for it in the digital electronic domain, before passing the resulting signal to a Dual-PolMux OFDM transmitter (110). Alternately, CD compensation can also be performed in the optical domain by inserting a span of dispersion compensating fiber (DCF), denoted by (200), at the output of the PolMUX OFDM transmitter (110), which is a well-known CD compensation technique in the field, wherein the deterministic CD-induced phase shift is proportional to the length of the DCF span, which is can be readily pre-calculated using well-known formulas.

With these structures in place, we may now show a more detailed operation of the Rate L Inner Encoder (100) for L=1 (101), L=2 (102), and L=4 (103), respectively. In these showings, the notation $S_{X,i}$ denotes the complex baseband QAM symbol that the Dual-PolMux transmitter (110) will modulate onto the $i^{th}$ OFDM subcarrier in polarization X (Pol-X); $S_{X, N-i+1}$ has an analogous meaning, where N is the Fast Fourier Transform (FFT) size. In a similar manner, $S_{Y,i}$ and $S_{Y, N-i+1}$ respectively denote the complex baseband QAM symbols that will be modulated onto the $i^{th}$ and $(N-i+1)^{th}$ subcarrier in polarization Y (Pol-Y).

Given these four input symbols, the Inner Encoders (101) and (102) first form the 2×2 matrices $S_1$ and $S_2$ as shown in [3] and [4] for rates L=1 and L=2 respectively, where $S^*_{X,i}$ denotes the complex conjugate of symbol $S_{X,i}$.

$$S_1 = \begin{bmatrix} S_{X,i} & S^*_{Y,i} \\ S_{Y,i} & -S^*_{X,i} \end{bmatrix}, \quad [3]$$

$$S_2 = \begin{bmatrix} S_{X,N-i+1} & S^*_{Y,N-i+1} \\ S_{Y,N-i+1} & -S^*_{X,N-i+1} \end{bmatrix} \Rightarrow S_{L=1} = \begin{bmatrix} S_1 & S^*_2 \\ S_2 & -S^*_1 \end{bmatrix}$$

$$S_1 = \begin{bmatrix} S_{X,i} & S^*_{Y,i} \\ S_{Y,i} & -S^*_{X,i} \end{bmatrix}, \quad [4]$$

$$S_2 = \begin{bmatrix} S_{X,N-i+1} & S^*_{Y,N-i+1} \\ S_{Y,N-i+1} & -S^*_{X,N-i+1} \end{bmatrix} \Rightarrow S_{L=2} = \begin{bmatrix} S_1 \\ S_2 \end{bmatrix}$$

Next, for rate L=1, (101) forms the inner code given by the 4×4 matrix $S_{L=1}$ in [3], which can then become the input to chromatic dispersion (CD) compensator (104) and/or to the Dual-PolMux OFDM transmitter (110).

For L=2, (102) forms the inner code given by the 4×2 matrix $S_{L=2}$ in [4], which is then input to (104). Moreover, for L=4, there are three inner coding possibilities, shown in [5], [6], and [7], respectively, such that (103) forms the inner code given by the 4×1 matrix $S_{L=4}$, wherein $\otimes$ denotes the Kronecker product, and $S_{L=4}$ can become input to either (104) or (110). In [7], θ and φ denote the CD-induced phase shifts experienced by the $i^{th}$ and $(N-i+1)^{th}$ OFDM subcarrier, respectively. In the case of optical dispersion compensation (200) at the output of (110), the special case θ=0 and φ=0 can be invoked.

$$D = \frac{1}{\sqrt{2}}\begin{bmatrix} 1 & 1 \\ 1 & -1 \end{bmatrix}, \quad E = D \otimes \begin{bmatrix} 1 & 0 \\ 0 & 1 \end{bmatrix} \Rightarrow S_{L=4} = E\begin{bmatrix} S_{X,i} \\ S_{Y,i} \\ S_{X,N-i+1} \\ S_{Y,N-i+1} \end{bmatrix} \quad [5]$$

$$D = \frac{1}{\sqrt{2}}\begin{bmatrix} 1 & 1 \\ 1 & -1 \end{bmatrix}, \quad E = D \otimes \begin{bmatrix} 1 & 0 \\ 0 & 1 \end{bmatrix}, \quad S_1 = D\begin{bmatrix} S_{X,i} \\ S_{Y,i} \end{bmatrix}, \quad [6]$$

$$S_2 = D\begin{bmatrix} S_{X,N-i+1} \\ S_{Y,N-i+1} \end{bmatrix} \Rightarrow S_{L=4} = E\begin{bmatrix} S_1 \\ S_2 \end{bmatrix}$$

$$D = \frac{1}{\sqrt{2}}\begin{bmatrix} 1 & 1 \\ 1 & -1 \end{bmatrix}, \quad [7]$$

$$\Delta = \begin{bmatrix} e^{-j2\theta} & 0 & 0 & 0 \\ 0 & 1 & 0 & 0 \\ 0 & 0 & e^{-j2\phi} & 0 \\ 0 & 0 & 0 & 1 \end{bmatrix} \Rightarrow S_{L=4} = \Delta\left(\begin{bmatrix} 1 & 0 \\ 0 & 1 \end{bmatrix} \otimes D\right)\begin{bmatrix} S_{X,i} \\ S_{Y,i} \\ S_{X,N-i+1} \\ S_{Y,N-i+1} \end{bmatrix}$$

The choice of the inner code rate, L, will depend on specific system parameters. Namely, the design of [3] with L=1 will provide two- and four-fold higher reliability (as measured by the achievable diversity order), compared to the designs of [5], [6] and [7], respectively. On the other hand, the data throughput of the L=4 inner code will be two- and four-fold higher than that of the L=2 and L=1 designs, respectively.

Figure 4:
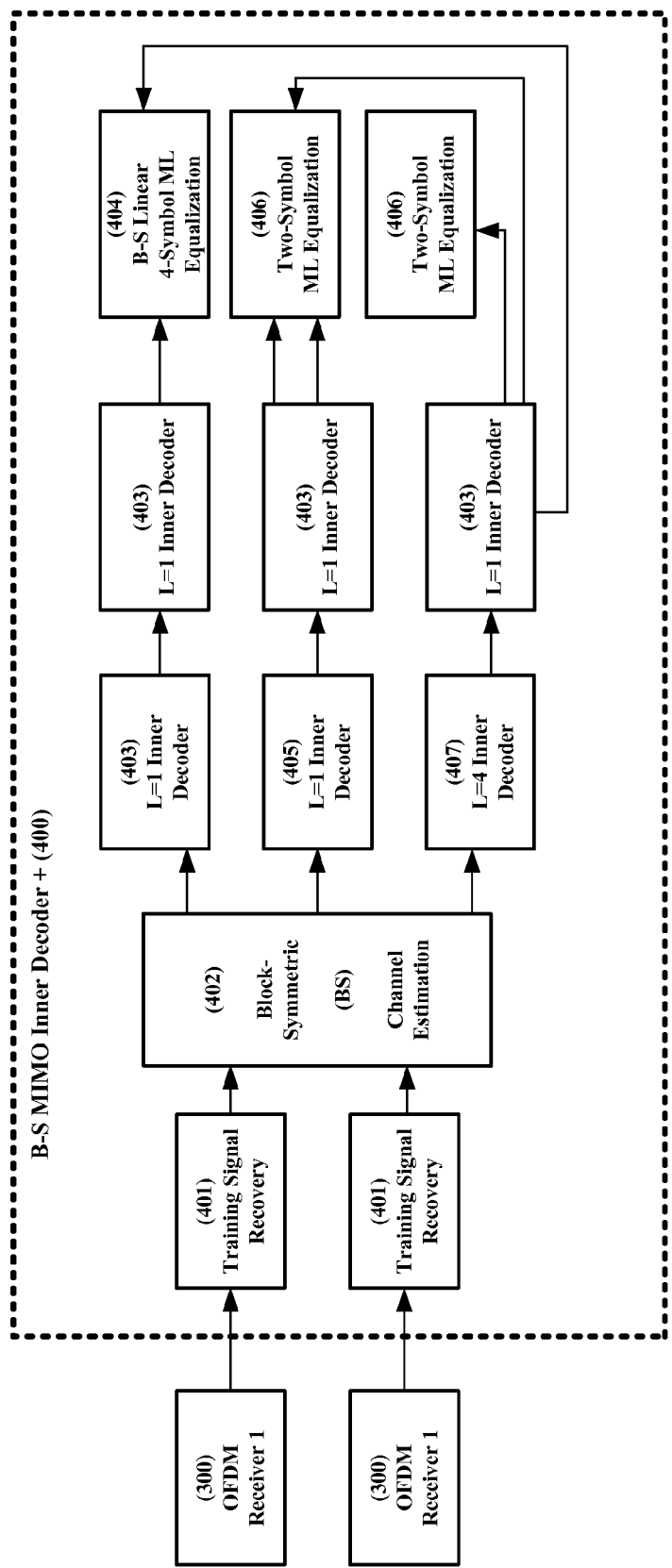
FIG. 4 is a schematic block diagram depicting a computationally-efficient block-symmetric (B-S) MIMO Inner Decoder+Equalizer according to an aspect of the present disclosure.
Figure 5:
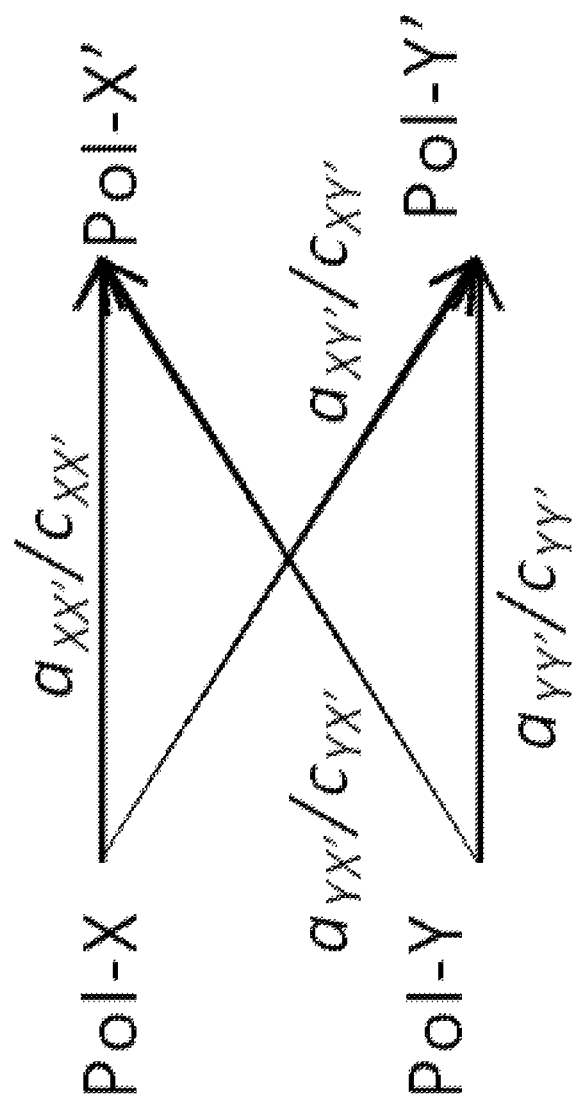
FIG. 5 is a schematic diagram of a channel model for B-S MIMO equalization according to an aspect of the present disclosure.

With reference now to FIG. 4, there it shows the detailed architecture of the (B-S) MIMO Inner Decoder+Equalizer (400). The operation of (400) in FIG. 4 for each OFDM subcarrier is based on the channel model shown in FIG. 5. As shown by FIG. 5, due to polarization rotation, signal components on each of the two input polarization states, Pol-X and Pol-Y, may migrate to one of the output polarization states, Pol-X' and Pol-Y'. The notation XY', for example, denotes component migration from input polarization Pol-X to output polarization Pol-Y'.

Moreover, in FIG. 5, coefficients a and c are used to denote the polarization rotation of the OFDM data band and optical carrier signals, respectively. Thus, $a_{XY'}$ denotes the channel coefficient experienced by the OFDM data band component that migrates from Pol-X to Pol-Y', while $c_{XY'}$ refers to the coefficient decided by the portion of the optical carrier launched from Pol-X that ends up in Pol-Y'. It is also noted that the coefficients a and c can change from subcarrier to subcarrier. As shown in FIG. 4, at the output of the OFDM receivers (300), training signal recovery (401) is first performed within the inner decoder.

Figure 6:
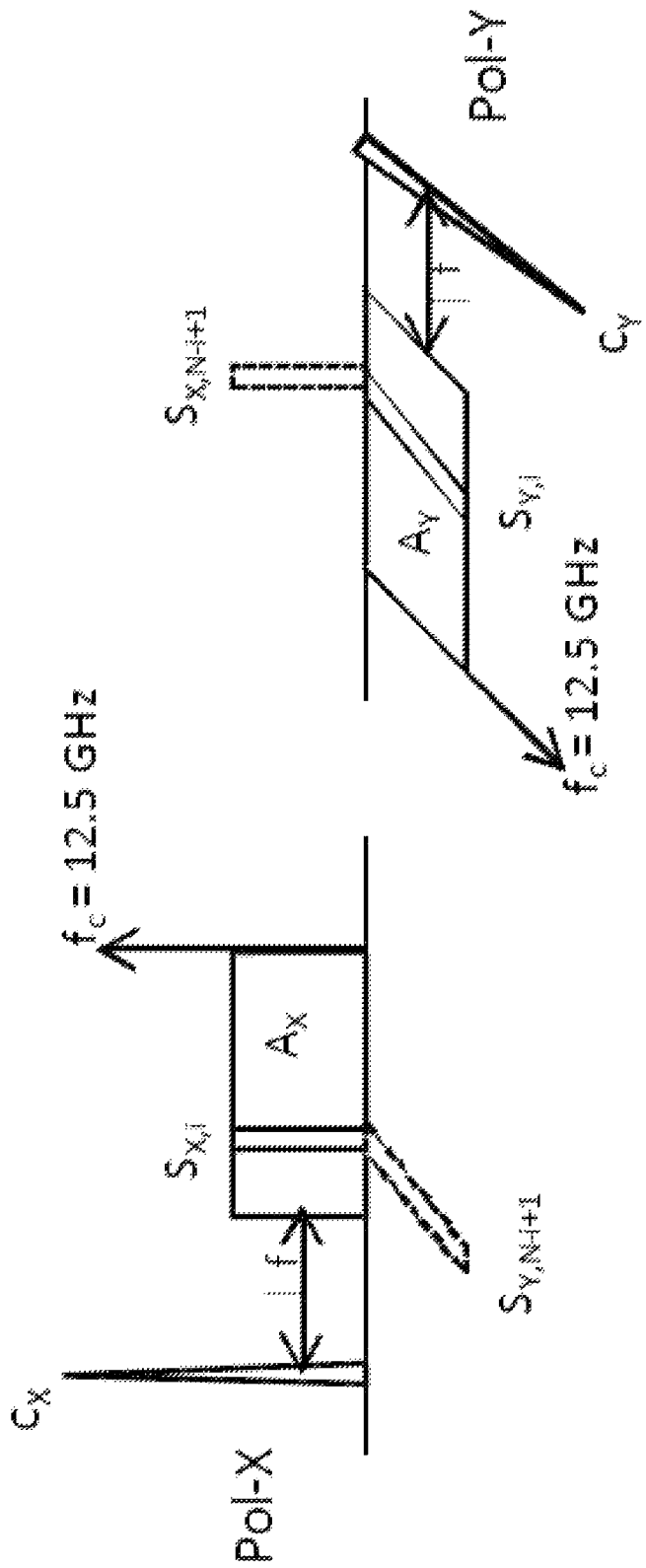
FIG. 6 is a schematic depicting training signals Ax and Ay for training signal recovery according to an aspect of the present disclosure.
Figure 7:
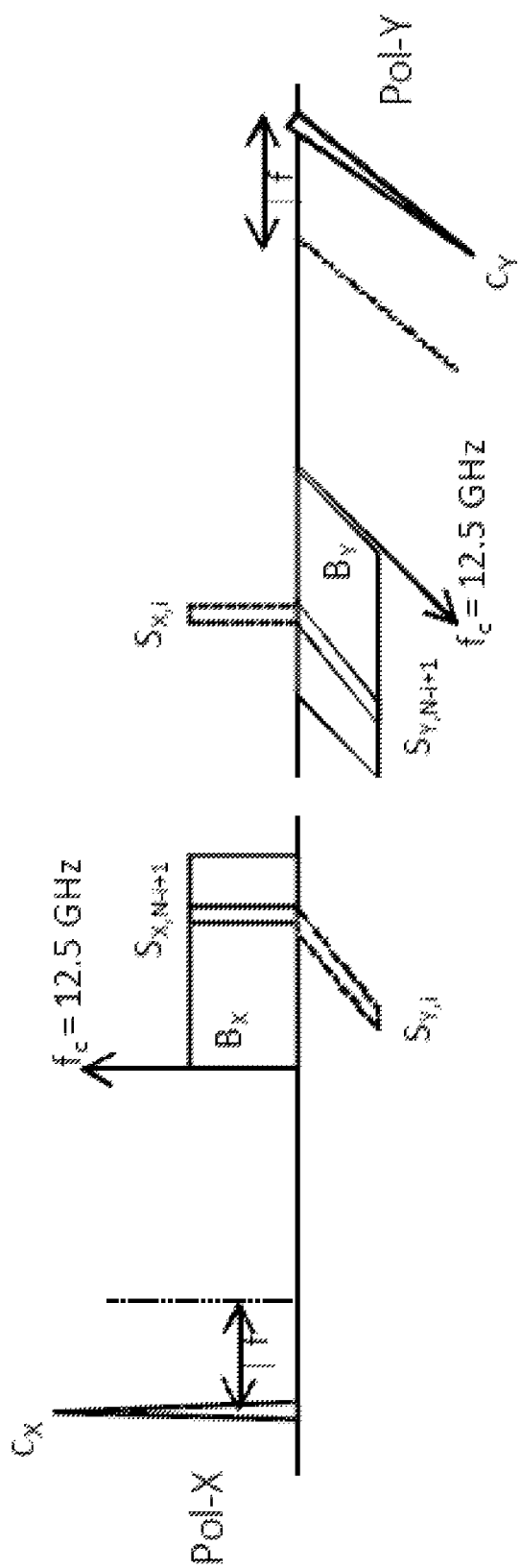
FIG. 7 is a schematic depicting training signals Bx and By for training signal recovery according to an aspect of the present disclosure.

The training signals, as shown in FIG. 6 and FIG. 7, were composed of two different training sets: A and B. Training set A, shown in FIG. 6, comprises subsets $A_X$ and $A_Y$ during which known symbols are transmitted on OFDM subcarriers in the frequency range $\Delta f-f_c$ in Pol-X and Pol-Y, respectively. In FIG. 6 and FIG. 7, $f_c$=12.5 GHz for illustration, without loss of generality. The complete training signal for the proposed POLMUX-DD architecture consisted of at least one pair of Training sets A and B transmitted sequentially in time; the complete training signal thus consists of the sequence: $A_X$, $A_Y$, $B_X$, $B_Y$.

Continuing with the discussion of FIG. 4, following training signal recovery (401), the B-S channel estimation (402) is performed by combining the output from the four training sequences $A_X$, $A_Y$, $B_X$, $B_Y$ in a way which recognizes the 4×4 block-symmetric channel estimation matrix on each OFDM subcarrier, as shown in [8], [9], [10] and [11] below, where in [11], $\delta$ denotes a polarization-rotation induced phase.

$$\underbrace{\begin{bmatrix} c_{XX'}a_{XX'} & c_{YX'}a_{YX'} & c_{YX'}a_{XX'} & c_{XX'}a_{YX'} \\ c_{XY'}a_{XY'} & c_{YY'}a_{YY'} & c_{YY'}a_{XY'} & c_{XY'}a_{YY'} \\ c_{YX'}a_{XX'} & c_{XX'}a_{YX'} & c_{XX'}a_{XX'} & c_{YX'}a_{YX'} \\ c_{YY'}a_{XY'} & c_{XY'}a_{YY'} & c_{XY'}a_{XY'} & c_{YY'}a_{YY'} \end{bmatrix}}_{\text{B-S Channel Estimation Matrix}} \times \underbrace{\begin{bmatrix} S_{X,i} \\ S_{Y,i} \\ S_{X,N-i+1} \\ S_{Y,N-i+1} \end{bmatrix}}_{\text{Tx Signals}} + v = \underbrace{\begin{bmatrix} S_{X',i} \\ S_{Y',i} \\ S_{X',N-i+1} \\ S_{Y',N-i+1} \end{bmatrix}}_{\text{Re Signals}} = y \quad [8]$$

$$\underbrace{\begin{bmatrix} |c_{XX'}a_{XX'}| & |c_{YX'}a_{YX'}| & |c_{YX'}a_{XX'}| & |c_{XX'}a_{YX'}| \\ |c_{XY'}a_{XY'}| & |c_{YY'}a_{YY'}| & |c_{YY'}a_{XY'}| & |c_{XY'}a_{YY'}| \\ |c_{YX'}a_{XX'}| & |c_{XX'}a_{YX'}| & |c_{XX'}a_{XX'}| & |c_{YX'}a_{YX'}| \\ |c_{YY'}a_{XY'}| & |c_{XY'}a_{YY'}| & |c_{XY'}a_{XY'}| & |c_{YY'}a_{YY'}| \end{bmatrix}}_{\text{B-S Real Channel Estimation Matrix}} \times \underbrace{\begin{bmatrix} S_{X,i} \\ S_{Y,i} \\ S_{X,N-i+1} \\ S_{Y,N-i+1} \end{bmatrix}}_{\text{Tx Signals}} + v = \underbrace{\begin{bmatrix} S_{X',i} \\ S_{Y',i} \\ S_{X',N-i+1} \\ S_{Y',N-i+1} \end{bmatrix}}_{\text{Re Signals}} = y \quad [9]$$

$$\underbrace{\begin{bmatrix} |c_{XX'}a_{XX'}| & |c_{YX'}a_{YX'}| & |c_{YX'}a_{XX'}| & |c_{XX'}a_{YX'}| \\ |c_{XY'}a_{YX'}| & |c_{XX'}a_{XX'}| & |c_{XX'}a_{YX'}| & |c_{YX'}a_{XX'}| \\ |c_{YX'}a_{XX'}| & |c_{XX'}a_{YX'}| & |c_{XX'}a_{XX'}| & |c_{YX'}a_{YX'}| \\ |c_{XX'}a_{YX'}| & |c_{YX'}a_{XX'}| & |c_{YX'}a_{YX'}| & |c_{XX'}a_{YX'}| \end{bmatrix}}_{\text{Polarization Symmetric B-S Real Channel Estimation Matrix}} \times \underbrace{\begin{bmatrix} S_{X,i} \\ S_{Y,i} \\ S_{X,N-i+1} \\ S_{Y,N-i+1} \end{bmatrix}}_{\text{Tx Signals}} + v = \underbrace{\begin{bmatrix} S_{X',i} \\ S_{Y',i} \\ S_{X',N-i+1} \\ S_{Y',N-i+1} \end{bmatrix}}_{\text{Re Signals}} = y \quad [10]$$

$$\underbrace{\begin{bmatrix} |c_{XX'}a_{XX'}(i)|e^{j\theta} & |c_{YX'}a_{YX'}(i)|e^{-j\theta} & -|c_{YX'}a_{XX'}(N-i+1)|e^{-j(\theta+\delta)} & -|c_{XX'}a_{YX'}(N-i+1)|e^{j(\theta+\delta)} \\ |c_{XY'}a_{XY'}(i)|e^{j\theta} & |c_{YY'}a_{YY'}(i)|e^{-j\theta} & |c_{YY'}a_{XY'}(N-i+1)|e^{-j(\theta+\delta)} & |c_{XY'}a_{YY'}(N-i+1)|e^{j(\theta+\delta)} \\ -|c_{YX'}a_{XX'}(i)|e^{-j(\varphi+\delta)} & -|c_{XX'}a_{YX'}(i)|e^{j(\varphi+\delta)} & |c_{XX'}a_{XX'}(N-i+1)|e^{j\varphi} & |c_{YX'}a_{YX'}(N-i+1)|e^{-j\varphi} \\ |c_{YY'}a_{XY'}(i)|e^{-j(\varphi+\delta)} & |c_{XY'}a_{YY'}(i)|e^{j(\varphi+\delta)} & |c_{XY'}a_{XY'}(N-i+1)|e^{j\varphi} & |c_{YY'}a_{YY'}(N-i+1)|e^{-j\varphi} \end{bmatrix}}_{\text{Generalized B-S Channel Estimation Matrix}} \times \underbrace{\begin{bmatrix} S_{X,i} \\ S_{Y,i} \\ S_{X,N-i+1} \\ S_{Y,N-i+1} \end{bmatrix}}_{\text{Tx Signals}} + v = \underbrace{\begin{bmatrix} S_{X',i} \\ S_{Y',i} \\ S_{X',N-i+1} \\ S_{Y',N-i+1} \end{bmatrix}}_{\text{Re Signals}} = y \quad [11]$$

Firstly, to recognize and classify the B-S structure shown in [8]-[11], the channel estimation module (402) can apply well-known techniques, such as the least mean squares (LMS) method, or others which are well-known from prior art. However, it is important to note that the channel estimation structures shown in [8]-[11] are not known from prior art, and are the key enablers of the efficient transmitter and receiver side processing algorithms, examples or which are demonstrated in, but not limited to this disclosure. The exact B-S channel estimation matrix variant, [8]-[11], that is identified by (402) can vary depending on the fiber channel conditions. For example, if there is significant chromatic dispersion (CD) in the transmission system, the B-S Channel Estimation matrix can recognized as [8] or [11]. Moreover, if CD is either negligible or pre-compensated such that polarization rotation constitutes the dominant optical channel impairment, further simplification of the matrix of [8] is performed to form the B-S Real Channel Estimation matrix of [9], where | | denotes the magnitude of the enclosed variable. Finally, if the system is also polarization-symmetric, such that $|c_{XX}a_{XX'}|=|c_{YY}a_{YY'}|$, $|c_{XY}a_{XY'}|=|c_{YX}a_{YX'}|$, $|c_{XX}a_{YX'}|=|c_{YY}a_{XY'}|$ and $|c_{YX}a_{XX'}|=|c_{XY}a_{YY'}|$, the polarization-symmetric B-S Real Channel Estimation matrix of [10] is obtained, as an additional simplification of the matrix in [9]. The entries in the B-S matrices of [8]-[11] will also depend on the subcarrier index, i, where a form of this dependence is shown explicitly in [11]. Moreover, it is noted that a polarization-symmetric generalized B-S channel estimation matrix is a special case of [11], which can be obtained making the substitutions described above, and is thus implicitly included in the structure of [11].

In [8], [9], [10] and [11], v and y denote the noise vector and the vector of received symbols, respectively, wherein both v and the transmit signal vector have been normalized such that the covariance of each is the identity matrix. As mentioned above and as can be appreciated from [8]-[11], the module (402) will recognize that the channel estimation matrix output of (401) is not arbitrary, but has an important block-symmetric structure and as such may be re-expressed as $$\begin{bmatrix} A & B \\ B & A \end{bmatrix} = \begin{bmatrix} a & b & e & f \\ c & d & g & h \\ e & f & a & b \\ g & h & c & d \end{bmatrix}$$ [12]

where both A and B are 2×2 matrices. Moreover, the B-S real channel estimation matrix of [9] has a yet stronger structure, in that it is a purely real 4×4 B-S matrix. Using first the 4×4 B-S channel estimation matrix (402) of [8] and the 4×4 inner code matrix $S_{L=1}$, the rate L=1 inner decoder (403) computes the 16×4 matrix $\tilde{S}_{L=1}$ as shown in [13] below, where $y_1, y_2, y_3, y_4$ are 4×1 vectors of received complex data symbols. In the sequel, the superscript $T$ denotes the matrix transpose operation, the superscript * denotes the matrix conjugate operation and the superscript $H$ denotes the matrix conjugate transpose operation.

It is noted that inner decoding (403) to obtain the matrix $\tilde{S}_{L=1}$ introduces no additional digital operations since it consists of re-arranging, and if/when needed, conjugating and/or negating entries from the B-S channel estimation matrix (402) of [8]. Moreover, from [13], it can be shown that the inner decode matrix $\tilde{S}_{L=1}$ is not an arbitrary matrix but has a semi-unitary structure such that $\tilde{S}_{L=1}^H \tilde{S}_{L=1} = \alpha I_{4\times 4}$, where α denotes the scalar proportional to the signal-to-interference-and-noise ratio (SINR) and $I_{4\times 4}$ is the 4×4 identity matrix. Consequently, due to the B-S structure of the channel estimation matrix and the structure of the rate L=1 inner encoder, the theoretically-optimal 4-symbol ML Equalizer reduces to four independent linear zero-forcing (ZF) equalizers, such that optimal 4-symbol ML equalization (404) is performed by component-wise quantization of the vector obtained in [14].

$$S_{L=1}^{\tilde{H}} \begin{bmatrix} y_1 \\ y_2^* \\ y_3^* \\ y_4 \end{bmatrix} = \begin{bmatrix} \hat{S}_{X,i} \\ \hat{S}_{Y,i} \\ \hat{S}_{X,N-i+1} \\ \hat{S}_{Y,N-i+1} \end{bmatrix}$$ [14]

Since, the computation of $\tilde{S}_{L=1}^H$ does not add additional computational complexity, the 4-symbol ML equalization of [14] requires only a minimal 64 additional complex multiplications, while producing theoretically-optimal performance (no noise enhancement occurs in this case.) In terms of reliability, it is straightforward to show that the L=1 inner coding design of (403) produces a diversity order of 4, for a four-fold increase in reliability over conventional POLMUX-OFDM-DD systems without inner-coding.

Turning now to the case of the 4×4 B-S real channel estimation matrix (402) of [9], in this case, the 4×4 B-S channel estimation matrix for inner decoding and equalization becomes purely real. Consequently, using the 4×4 B-S real channel estimation matrix of [9] and the 4×4 inner code matrix $S_{L=1}$, the rate L=1 inner decoder (403) computes the 16×4 inner decode matrix $\tilde{S}_{L=1}$ as shown in [13], but this time the matrix entries will be completely real values.

Consequently, the 4-symbol ML equalization of [14] (404) will thus require only 128 real multiplications in this case, rather than 64 complex multiplications (which in turn are equal to 256 real multiplications) as was the case with the B-S channel estimation matrix of [7], reducing the computational complexity of operation (404) by approximately 50%. This is an important computational savings since the step (404) needs to be performed very often in practice. It is also noted that this complexity reduction originates from the purely real matrix structure of the channel estimation matrix in [9], and thus also applies to our previous related work on sub-ML linear equalization in POLMUX-OFDM-DD systems.

$$Y = [y_1 \ y_2 \ y_3 \ y_4] = \begin{bmatrix} A & B \\ B & A \end{bmatrix} S_{L=1} + V \Rightarrow \begin{bmatrix} y_1 \\ y_2^* \\ y_3^* \\ y_4 \end{bmatrix} = \tilde{S}_{L=1} \begin{bmatrix} S_{X,i} \\ S_{Y,i} \\ S_{X,N-i+1} \\ S_{Y,N-i+1} \end{bmatrix} + v$$ [13]

$$\tilde{S}_{L=1} = \begin{bmatrix} a & c & e & g & -b^* & -d^* & -f^* & -h^* & -e^* & -g^* & -a^* & -c^* & f & h & b & d \\ b & d & f & h & a^* & c^* & e^* & g^* & -f^* & -h^* & -b^* & -d^* & -e & -g & -a & -c \\ e & g & a & c & -f^* & -h^* & -b^* & -d^* & a^* & c^* & e^* & g^* & -b & -d & -f & -h \\ f & h & b & d & e^* & g^* & a^* & c^* & b^* & d^* & f^* & h^* & a & c & e & g \end{bmatrix}^T$$

Finally, using the polarization-symmetric B-S real channel estimation matrix of [10] will enable some further simplification of both steps (403) and (404), both because all computational advantages of the matrix of [9] are inherited, but also because now the substitutions a=d, b=c, e=h and f=g can be made in forming the $\tilde{S}_{L=1}$ matrix of FIG. 12 and $\tilde{S}^H_{L=1}$ matrix of [14].

Relationship [15] illustrates a second embodiment of inner decoder with rate L=2 (405). While the diversity order achievable with this scheme is two compared to the diversity order four of (403), the data throughput of the L=2 inner code will also be two-fold higher than that of the L=1 design, offering an attractive compromise between data rate and reliability. It is noted that since the L=2 matrix $\tilde{S}_{L=2}$ (405) can be formed as a 8×4 sub-matrix of $\tilde{S}_{L=1}$, the 16×4 matrix for L=1 decoding (403), the formation of $\tilde{S}_{L=2}$, as shown in [15], does not introduce additional computational complexity in the B-S MIMO decoder (400).

$$Y = [y_1 \quad y_2] = \begin{bmatrix} A & B \\ B & A \end{bmatrix} S_{L=2} + V \Rightarrow z = \begin{bmatrix} y_1 \\ y_2^* \end{bmatrix} = \tilde{S}_{L=2} \begin{bmatrix} S_{X,i} \\ S_{Y,i} \\ S_{X,N-i+1} \\ S_{Y,N-i+1} \end{bmatrix} + \tilde{v} \quad [15]$$

$$\tilde{S}_{L=2} = \begin{bmatrix} a & c & e & g & -b^* & -d^* & -f^* & -h^* \\ b & d & f & h & a^* & c^* & e^* & g^* \\ e & g & a & c & -f^* & -h^* & -b^* & -d^* \\ f & h & b & d & e^* & g^* & a^* & c^* \end{bmatrix}^T$$

$$\tilde{z} = \tilde{S}^H_{L=2} z =$$

$$\tilde{S}^H_{L=2} \tilde{S}_{L=2} \begin{bmatrix} S_{X,i} \\ S_{Y,i} \\ S_{X,N-i+1} \\ S_{Y,N-i+1} \end{bmatrix} + \hat{v} = \begin{bmatrix} \beta & 0 & \gamma & 0 \\ 0 & \beta & 0 & \gamma \\ \gamma & 0 & \beta & 0 \\ 0 & \gamma & 0 & \beta \end{bmatrix} \begin{bmatrix} S_{X,i} \\ S_{Y,i} \\ S_{X,N-i+1} \\ S_{Y,N-i+1} \end{bmatrix} + \hat{v} \Rightarrow$$

$$\begin{bmatrix} \tilde{z}_1 \\ \tilde{z}_3 \\ \tilde{z}_2 \\ \tilde{z}_4 \end{bmatrix} = \underbrace{\begin{bmatrix} \beta & 0 & \gamma & 0 \\ \gamma & 0 & \beta & 0 \\ 0 & \beta & 0 & \gamma \\ 0 & \gamma & 0 & \beta \end{bmatrix}}_{G} \begin{bmatrix} S_{X,i} \\ S_{Y,i} \\ S_{X,N-i+1} \\ S_{Y,N-i+1} \end{bmatrix} + \begin{bmatrix} \hat{v}_1 \\ \hat{v}_3 \\ \hat{v}_2 \\ \hat{v}_4 \end{bmatrix}$$

From [15], it can also be seen that the product matrix $\tilde{S}^H_{L=2}\tilde{S}_{L=2}$ also has a particular block-symmetric structure, wherein both β and γ are real numbers, and also β>0. By permuting the $2^{nd}$ and $3^{rd}$ rows of this product matrix, the matrix G is formed, whose structure reveals that the optimal equalization of symbols $S_{X,i}$ and $S_{X,N-i+1}$ is completely independent from the optimal equalization of symbols $S_{Y,i}$ and $S_{Y,N-i+1}$, and vice versa. Consequently, the theoretically-optimal 4-symbol ML Equalizer reduces to two independent two-symbol ML equalizers (406), with inputs as shown in [16].

$$\underbrace{\begin{bmatrix} \beta & \gamma \\ \gamma & \beta \end{bmatrix}}_{C} \begin{bmatrix} S_{X,i} \\ S_{X,N-i+1} \end{bmatrix} + \hat{v}_1 \quad \underbrace{\begin{bmatrix} \beta & \gamma \\ \gamma & \beta \end{bmatrix}}_{C} \begin{bmatrix} S_{Y,i} \\ S_{Y,N-i+1} \end{bmatrix} + \hat{v}_2 \quad [16]$$

In [16], $\hat{v}_1$, $\hat{v}_2$, denote independent noise vectors each with covariance matrix given by C. Moreover, since both β and γ are real numbers, both of the complex 2-symbol ML equalizers in [16] further decompose, such that the real and imaginary portions can be processed separately. As a result, the complexity of the two 2-symbol ML equalizers (406) will only grow linearly with the size of the constellation from which the four symbols, ($S_{X,i}$, $S_{X,N-i+1}$, $S_{Y,i}$ and $S_{Y,N-i+1}$), are selected. In systems where the B-S Real Channel Estimation Matrix of Fig. [9] or the Polarization Symmetric B-S Real Channel Estimation Matrix of [10] are in effect instead, the additional computational advantages in the L=2 case will be analogous to those described above for L=1 inner encoding/decoding.

$$y = \begin{bmatrix} A & B \\ B & A \end{bmatrix} S_{L=4} + v \Rightarrow \tilde{y} = Ey = \tilde{S}_{L=4} \begin{bmatrix} S_{X,i} \\ S_{Y,i} \\ S_{X,N-i+1} \\ S_{Y,N-i+1} \end{bmatrix} + \tilde{v} \quad [17]$$

$$\tilde{S}_{L=4} = E \begin{bmatrix} A & B \\ B & A \end{bmatrix} E = \begin{bmatrix} (A+B) & 0 \\ 0 & (A-B) \end{bmatrix}$$

Relationship [17] illustrates the proposed inner decoder with rate L=4 (407), to be used decode the L=4 inner coding scheme of [6]. While the diversity order achievable with this scheme is one compared to the diversity order four of (403), the data throughput of the L=4 inner code will also be four-fold higher than that of the L=1 design, offering higher data throughput in bits/second for a fixed physical bandwidth. From the structure of $\tilde{S}_{L=4}$ in [17], it can be seen that the optimal equalization of symbols $S_{X,i}$ and $S_{Y,i}$ is completely independent from the optimal equalization of symbols $S_{X,N-i+1}$ and $S_{Y,N-i+1}$, and vice versa. Consequently, the theoretically-optimal 4-symbol ML Equalizer reduces to two independent two-symbol ML equalizers (406), with inputs as shown in [18]. It is noted that both A+B and A−B in [16] are 2×2 matrices, that can be either complex (if the channel estimation matrix of [8] is used), or real (if the channel estimation matrix of [9] is used.) In the case of a real channel estimation matrix, the computational complexity of the operations in [18] can be further simplified by processing real and imaginary parts separately.

$$[A+B] \begin{bmatrix} S_{X,i} \\ S_{Y,i} \end{bmatrix} + \hat{v}_1 \quad [A-B] \begin{bmatrix} S_{X,N-i+1} \\ S_{Y,N-i+1} \end{bmatrix} + \hat{v}_2 \quad [18]$$

Relationship [19] illustrates the proposed inner decoder with rate L=4 (407), to be used on the polarization-symmetric real channel estimation matrix of [10] to decode the L=4 inner coding scheme of [5]. While the diversity order achievable with this scheme is one compared to the diversity order four of (403), the data throughput of the L=4 inner code will also be four-fold higher than that of the L=1 design, offering higher data throughput in bits/second for a fixed physical bandwidth.

$$y = \begin{bmatrix} A & B \\ B & A \end{bmatrix} S_{L=4} + v \Rightarrow \tilde{y} = \quad [19]$$

$$(I_2 \otimes D) Ey = \tilde{S}_{L=4} \begin{bmatrix} S_{X,i} \\ S_{Y,i} \\ S_{X,N-i+1} \\ S_{Y,N-i+1} \end{bmatrix} + \tilde{v}$$

-continued $$\tilde{S}_{L=4} = (I_2 \otimes D)E \begin{bmatrix} A & B \\ B & A \end{bmatrix} E(I_2 \otimes D) = \begin{bmatrix} D^T(A+B)D & 0 \\ 0 & D^T(A-B)D \end{bmatrix}$$

Substituting $$A = \begin{bmatrix} a & b \\ b & a \end{bmatrix} \text{ and } B = \begin{bmatrix} e & f \\ f & e \end{bmatrix},$$

it can readily be shown that the ML equalizer inputs are given by [20] below, showing that the two 2-symbol ML equalizers of [18] further reduce to a linear 4-symbol ML equalizer. It is also noted that the matrix $\tilde{S}_{L=4}$ will be diagonal even if the elements a, b, e, f are complex-valued scalars, thus a linear 4-symbol ML equalizer can still be obtained even in this case.

$$\begin{bmatrix} a+e+b+f & 0 \\ 0 & a+e-b+f \end{bmatrix} \begin{bmatrix} S_{X,i} \\ S_{Y,i} \end{bmatrix} + \tilde{v}_1 \quad [20]$$

$$\begin{bmatrix} a-e+b-f & 0 \\ 0 & a-e-b+f \end{bmatrix} \begin{bmatrix} S_{X,N-i+1} \\ S_{Y,N-i+1} \end{bmatrix} + \tilde{v}_2$$

Relationship [22] illustrates the proposed inner decoder with rate L=4 (407), to be used on the generalized polarization-symmetric channel estimation matrix of [11], denoted by H in [22], to decode the L=4 inner coding scheme of [7]. While the diversity order achievable with this scheme is one compared to the diversity order four of (403), the data throughput of the L=4 inner code will also be four-fold higher than that of the L=1 design, offering higher data throughput in bits/second for a fixed physical bandwidth. In this case, the generalized polarization symmetric channel estimation matrix of [11] is recognized by (402) to have the general form $$\begin{bmatrix} A_1 & B_1 \\ B_2 & A_2 \end{bmatrix}$$

given by [21] where the superscript * denotes complex conjugation.

$$\begin{bmatrix} A_1 & B_1 \\ B_2 & A_2 \end{bmatrix} = \begin{bmatrix} ae^{j\theta} & be^{-j\theta} & -ge^{-j(\theta+\delta)} & -ge^{j(\theta+\delta)} \\ be^{j\theta} & ae^{-j\theta} & ge^{-j(\theta+\delta)} & ge^{j(\theta+\delta)} \\ -fe^{-j(\varphi+\delta)} & -fe^{j(\varphi+\delta)} & ce^{j\varphi} & de^{-j\varphi} \\ fe^{-j(\varphi+\delta)} & fe^{j(\varphi+\delta)} & de^{j\varphi} & ce^{-j\varphi} \end{bmatrix}, \quad [21]$$

$$a, b, c, d, f, g \geq 0$$

$$y = \begin{bmatrix} A_1 & B_1 \\ B_2 & A_2 \end{bmatrix} S_{L=4} + v \Rightarrow \tilde{y} = \quad [22]$$

$$(I_2 \otimes D)\left(\begin{bmatrix} e^{j\theta} & 0 \\ 0 & e^{j\varphi} \end{bmatrix} \otimes I_2\right) y = \tilde{S}_{L=4} \begin{bmatrix} S_{X,i} \\ S_{Y,i} \\ S_{X,N-i+1} \\ S_{Y,N-i+1} \end{bmatrix} + \tilde{v}$$

$$\tilde{S}_{L=4} = (I_2 \otimes D)\left(\begin{bmatrix} e^{j\theta} & 0 \\ 0 & e^{j\varphi} \end{bmatrix} \otimes I_2\right) \begin{bmatrix} A_1 & B_1 \\ B_2 & A_2 \end{bmatrix} \Delta(I_2 \otimes D) =$$

$$\begin{bmatrix} a+b & 0 & 0 & 0 \\ 0 & a-b & p+q & p-q \\ 0 & 0 & c+d & 0 \\ s+t & s-t & 0 & c-d \end{bmatrix}$$

$$p = ge^{-j\delta}e^{-j2\varphi} \quad s = fe^{-j\delta}e^{-j2\theta}$$
$$q = ge^{-j\delta}e^{j2(\theta+\delta)} \quad t = fe^{-j\delta}e^{j2(\varphi+\delta)}$$

From [22], it can be appreciated by those skilled in the art that, although it is not explicitly shown here, the structure of $\tilde{S}_{L=4}$ can be exploited in numerous ways known in prior art to achieve improved equalization performance (for example, via variants of ZF, MMSE and ML equalization techniques that are specialized to the presented channel structure), as well as to achieve reductions in the equalization computational complexity (as measured by the number of real multiplications required to compute the equalization output, for example), as well as to achieve increased reliability via transmitter side inner encoding techniques (for example, [7], and others not explicitly shown here.) Moreover, it can also be readily shown that the result of [22] also extends to the special case of CD pre-compensation, either via electronic or optical techniques, by substituting θ=0 and φ=0 in [22] and also to the polarization-symmetric case wherein a=b c=d in [21]. Likewise, starting from [22], additional computational simplifications and equalization performance benefits can be gained in the special case of a=c, b=d, f=g and θ=φ in [21], which are analogous to the benefits gained by specializing from channel estimation structure [9] to [10], for example. In particular, in this case we can exploit the fact that $$(D \otimes I_2) \begin{bmatrix} a+b & 0 & 0 & 0 \\ 0 & a-b & p+q & p-q \\ 0 & 0 & a+b & 0 \\ p+q & p-q & 0 & a-b \end{bmatrix} (D \otimes I_2) = \quad [23]$$

$$\begin{bmatrix} a+b & 0 & 0 & 0 \\ p+q & a+p-b-q & 0 & 0 \\ 0 & 0 & a+b & 0 \\ 0 & 0 & -p-q & a-b-p+q \end{bmatrix}$$

Those skilled in the art can readily appreciate that the structure of [22] and [23] is the key innovative feature which would enable the design and implementation of numerous specialized equalizers which exploit the structure for important performance benefits, and can be based on ML equalization, as well as linear equalization (ZF, MMSE), and are thus not explicitly shown in this disclosure but are denoted by general blocks (406) and (407) in FIG. 4.

We further note that the transformation using the matrix E (or the matrix E($I_2 \otimes D$)) at the transmitter and the matrix E (or the matrix ($I_2 \otimes D$)E) at the receiver can be combined with any lattice code. In particular, consider the model $$y_t = H_t x_t + v_t, \ldots 1 \leq t \leq T$$

where all $\{H\}_{t=1}^{T}$ have the form of the channel estimation matrix of [8], [9], [10] or [11], respectively. Suppose all $\{H\}_{t=1}^{T}$ have the form of the channel estimation matrix of Fig. [8] or [9]. We obtain the transformed model as $$z_t = Ey_t = EH_t x_t + Ev_t = \underbrace{EH_t E s_t}_{F_t} s_t + w_t, \ldots 1 \le t \le T,$$

$$F_t = \begin{bmatrix} A+B & 0 \\ 0 & A-B \end{bmatrix}$$

and where the noise vectors $\{w_t\}_{t=1}^{T}$ remain white and mutually uncorrelated. Note that when all $\{H_t\}_{t=1}^{T}$ have the form of the channel estimation matrix of [8] then all $\{F_t\}_{t=1}^{T}$ are complex-valued 4×4 block diagonal matrices, whereas when all $\{H_t\}_{t=1}^{T}$ have the form of the channel estimation matrix of [9] then all $\{F_t\}_{t=1}^{T}$ are real-valued 4×4 block diagonal matrices. An equivalent real-representation of the vectors $\{z_t\}_{t=1}^{T}$ can then be obtained as $$\tilde{z}_t = \tilde{F}_t \tilde{s}_t + \tilde{w}_t, \quad [24]$$

$$\tilde{z}_t = \begin{bmatrix} \tilde{z}_t^R \\ \tilde{z}_t^I \end{bmatrix}, \tilde{F}_t = \begin{bmatrix} \tilde{F}_t^R & -\tilde{F}_t^I \\ \tilde{F}_t^I & \tilde{F}_t^R \end{bmatrix}, \ldots 1 \le t \le T$$

where $\{\tilde{z}_t^R, \tilde{z}_t^I\}$ denote the real and imaginary parts of the vector $\tilde{z}_t$ respectively. Note that when all $\{H_t\}_{t=1}^{T}$ have the form of the channel estimation matrix of [9] then all $\{\tilde{F}_t\}_{t=1}^{T}$ are 8×8 block diagonal matrices. The vectors $\{\tilde{s}_t\}_{t=1}^{T}$ are obtained as follows.

$$\begin{bmatrix} \tilde{s}_1 \\ \vdots \\ \tilde{s}_T \end{bmatrix} = \tilde{G}\tilde{u} \quad [25]$$

The matrix $\tilde{G}$ is referred to as the generator matrix and is of size 8T×2Q, for some positive integer Q that is no greater than 4T. The vector $\tilde{u}$ is of size 2Q×1 and has its elements drawn from some real-valued constellation. T and Q are design parameters and a useful choice is T=2 and Q=8. $\tilde{G}$ could be any generator matrix satisfying some energy or power constraints. A useful choice is the generator matrix corresponding to "perfect" space-time (or space-frequency) block codes designed for the block diagonal complex-valued channel model. In the case all $\{\tilde{F}_t\}_{t=1}^{T}$ are 8×8 block diagonal matrices, $\tilde{G}$ could also be restricted to be block diagonal in order to obtain decoding complexity reduction. Finally note that when all $\{H_t\}_{t=1}^{T}$ have the form of the channel estimation matrix of [10], we obtain the transformed model as $$z_t = (I_2 \otimes D)Ey_t = (I_2 \otimes D)EH_t x_t + (I_2 \otimes D)Ev_t =$$
$$(I_2 \otimes D)EH_t E(I_2 \otimes D)s_t + w_t, \ldots 1 \le t \le T,$$

$$F_t = \begin{bmatrix} D(A+B)D & 0 \\ 0 & D(A-B)D \end{bmatrix}$$

Note that all $\{F_t\}_{t=1}^{T}$ are now 4×4 diagonal matrices. An equivalent real-representation of the vectors $\{z_t\}_{t=1}^{T}$ can then be obtained as in [24] and the vectors $\{\tilde{s}_t\}_{t=1}^{T}$ can be obtained as in [25]. A useful choice is T=1 and Q=4. $\tilde{G}$ could be any generator matrix satisfying some energy or power constraints. A useful choice for G is the generator matrix corresponding to "perfect" space-time (or space-frequency) block codes designed for the diagonal channel model.

Finally, it is noted that the channel estimation matrix structures of [8], [9], [10] and [11] enable notable reductions in overhead required for full channel state information feedback from the receiver to the transmitter, needed in order to achieve optimal operation for a given channel. Namely, for an arbitrary complex 4×4 channel estimation matrix, the feedback overhead would consist of 16 complex numbers. Let us denote the channel estimation matrix of [8] by $H_c$, that in [9] by $H_r$ and the one in [10] by $H_{rs}$, respectively. Then in each case, in order to allow unconstrained transmitter processing it is enough to convey the matrix $$EH_c^H H_c E \text{ or } EH_r^T H_r E \text{ or}$$
$$(I_2 \otimes D)EH_{rs}^T H_{rs} E(I_2 \otimes D),$$

respectively. It can be verified that conveying $EH_c^H H_c E$ requires feeding back 4 positive scalars and 2 complex-valued scalars. On the other hand, conveying $EH_r^T H_r E$ requires feeding back 4 positive scalars and 2 real-valued scalars, whereas conveying $(I_2 \otimes D)EH_{rs}^T H_{rs} E(I_2 \otimes D)$ requires feeding back 4 positive scalars.

At this point, while we have discussed and described the invention using some specific examples, those skilled in the art will recognize that our teachings are not so limited. More particularly, those skilled in the art will readily appreciate that methods according to the present disclosure may be performed by any of a variety of processing techniques/technologies including digital signal processors (DSPs) and/or performed by discrete or integrated components. As such, methods according to the present disclosure may be computer-implemented and performed by specialized or general purpose processors alone or in combination with other computational elements comprising digital computers. Finally, methods according to the present disclosure may be performed in combination with optical components which provide any of a variety of known optical processing techniques to improve the reliability of optical signal such as dispersion or other forms of optical compensation. Accordingly, the invention should be only limited by the scope of the claims attached hereto.

The invention claimed is:

1. A computer implemented method for joint transmitter and receiver processing for computationally efficient equalization in polarization multiplexed (POLMUX) optical orthogonal frequency division multiplexed (OFDM) transmission with direct detection said method characterized by the steps of:

by a computer:
  identifying a channel estimation matrix structure wherein the channel estimation matrix structure is classified as belonging to one or more of the structures in the group consisting of:

$$\underbrace{\begin{bmatrix} c_{XX'}a_{XX'} & c_{YX'}a_{YX'} & c_{YX'}a_{XX'} & c_{XX'}a_{YX'} \\ c_{XY'}a_{XY'} & c_{YY'}a_{YY'} & c_{YY'}a_{XY'} & c_{XY'}a_{YY'} \\ c_{YX'}a_{XX'} & c_{XX'}a_{YX'} & c_{XX'}a_{XX'} & c_{YX'}a_{YX'} \\ c_{YY'}a_{XY'} & c_{XY'}a_{YY'} & c_{XY'}a_{XY'} & c_{YY'}a_{YY'} \end{bmatrix}}_{B\text{-}S\ Channel\ Estimation\ Matrix} \times \underbrace{\begin{bmatrix} s_{X,i} \\ s_{Y,i} \\ s_{X,N-i+1} \\ s_{Y,N-i+1} \end{bmatrix}}_{Tx\ Signals} + v =$$

-continued $$\begin{bmatrix} S_{X',i} \\ S_{Y',i} \\ S_{X',N-i+1} \\ S_{Y',N-i+1} \end{bmatrix}_{Re\ Signals} = y$$

$$\underbrace{\begin{bmatrix} |c_{XX'}a_{XX'}| & |c_{YX'}a_{YX'}| & |c_{YX'}a_{XX'}| & |c_{XX'}a_{YX'}| \\ |c_{XY'}a_{XY'}| & |c_{YY'}a_{YY'}| & |c_{YY'}a_{XY'}| & |c_{XY'}a_{YY'}| \\ |c_{YX'}a_{XX'}| & |c_{XX'}a_{YX'}| & |c_{XX'}a_{XX'}| & |c_{YX'}a_{YX'}| \\ |c_{YY'}a_{XY'}| & |c_{XY'}a_{YY'}| & |c_{XY'}a_{XY'}| & |c_{YY'}a_{YY'}| \end{bmatrix}}_{\text{B-S Channel Estimation Matrix}} \times \underbrace{\begin{bmatrix} S_{X,i} \\ S_{Y,i} \\ S_{X,N-i+1} \\ S_{Y,N-i+1} \end{bmatrix}}_{\text{Tx Signals}} + v =$$

$$\begin{bmatrix} S_{X',i} \\ S_{Y',i} \\ S_{X',N-i+1} \\ S_{Y',N-i+1} \end{bmatrix}_{Re\ Signals} = y$$

$$\underbrace{\begin{bmatrix} |c_{XX'}a_{XX'}| & |c_{YX'}a_{YX'}| & |c_{YX'}a_{XX'}| & |c_{XX'}a_{YX'}| \\ |c_{YX'}a_{YX'}| & |c_{XX'}a_{XX'}| & |c_{XX'}a_{YX'}| & |c_{YX'}a_{XX'}| \\ |c_{YX'}a_{XX'}| & |c_{XX'}a_{YX'}| & |c_{XX'}a_{XX'}| & |c_{YX'}a_{YX'}| \\ |c_{XX'}a_{YX'}| & |c_{YX'}a_{XX'}| & |c_{YX'}a_{YX'}| & |c_{XX'}a_{XX'}| \end{bmatrix}}_{\substack{\text{Polarization Symmetric B-S Real Channel} \\ \text{Estimation Matrix}}} \times \underbrace{\begin{bmatrix} S_{X,i} \\ S_{Y,i} \\ S_{X,N-i+1} \\ S_{Y,N-i+1} \end{bmatrix}}_{\text{Tx Signals}} + v =$$

$$\begin{bmatrix} S_{X',i} \\ S_{Y',i} \\ S_{X',N-i+1} \\ S_{Y',N-i+1} \end{bmatrix}_{Re\ Signals} = y \text{ and}$$

$$\begin{bmatrix} |c_{XX'}a_{XX'}(i)|e^{j\theta} & |c_{YX'}a_{YX'}(i)|e^{-j\theta} & -|c_{YX'}a_{YX'}(N-i+1)|e^{-j(\theta+\delta)} & -|c_{XX'}a_{YX'}(N-i+1)|e^{j(\theta+\delta)} \\ |c_{XY'}a_{XY'}(i)|e^{j\theta} & |c_{YY'}a_{YY'}(i)|e^{-j\theta} & |c_{YY'}a_{XY'}(N-i+1)|e^{-j(\theta+\delta)} & |c_{XY'}a_{YY'}(N-i+1)|e^{j(\theta+\delta)} \\ -|c_{YX'}a_{XX'}(i)|e^{-j(\varphi+\delta)} & -|c_{XX'}a_{YX'}(i)|e^{j(\varphi+\delta)} & |c_{XX'}a_{XX'}(N-i+1)|e^{j\varphi} & |c_{YX'}a_{YX'}(N-i+1)|e^{-j\varphi} \\ |c_{YY'}a_{XY'}(i)|e^{-j(\varphi+\delta)} & |c_{XY'}a_{YY'}(i)|e^{j(\varphi+\delta)} & |c_{XY'}a_{XY'}(N-i+1)|e^{j\varphi} & |c_{YY'}a_{YY'}(N-i+1)|e^{-j\varphi} \end{bmatrix} \times$$
$$\underbrace{\phantom{XXX}}_{\text{Generalized B-S Channel Estimation Matrix}}$$

$$\underbrace{\begin{bmatrix} S_{X,i} \\ S_{Y,i} \\ S_{X,N-i+1} \\ S_{Y,N-i+1} \end{bmatrix}}_{\text{Tx Signals}} + v = \underbrace{\begin{bmatrix} S_{X',i} \\ S_{Y',i} \\ S_{X',N-i+1} \\ S_{Y',N-i+1} \end{bmatrix}}_{\text{Re Signals}} = y$$

and
exploiting the identified structure through the use of transmitter and/or receiver-side processing to achieve measurable performance improvements, wherein the performance improvement metrics include the bit error rate (BER), diversity order, and/or computational efficiency (number of operations needed to execute a task).

2. The method of claim 1 further characterized by inner encoding, with inner code rate L=1, of the form $$S_1 = \begin{bmatrix} S_{X,i} & S_{Y,i}^* \\ S_{Y,i} & -S_{X,i}^* \end{bmatrix},$$

$$S_2 = \begin{bmatrix} S_{X,N-i+1} & S_{Y,N-i+1}^* \\ S_{Y,N-i+1} & -S_{X,N-i+1}^* \end{bmatrix} \Rightarrow S_{L=1} \begin{bmatrix} S_1 & S_2^* \\ S_2 & -S_1^* \end{bmatrix}.$$

3. The method of claim 2 performed in a transmitter and/or receiver.

4. The method of claim 1 further characterized by inner encoding, with inner code rate L=2, of the form $$S_1 = \begin{bmatrix} S_{X,i} & S_{Y,i}^* \\ S_{Y,i} & -S_{X,i}^* \end{bmatrix},$$

$$S_2 = \begin{bmatrix} S_{X,N-i+1} & S_{Y,N-i+1}^* \\ S_{Y,N-i+1} & -S_{X,N-i+1}^* \end{bmatrix} \Rightarrow S_{L=1} \begin{bmatrix} S_1 \\ S_2 \end{bmatrix}.$$

5. The method of claim 4 performed in a transmitter and/or receiver.

6. The method of claim 1 further characterized by inner encoding, with inner code rate L=4, of the form $$D = \frac{1}{\sqrt{2}}\begin{bmatrix} 1 & 1 \\ 1 & -1 \end{bmatrix},$$

$$E = D \otimes \begin{bmatrix} 1 & 0 \\ 0 & 1 \end{bmatrix} \Rightarrow S_{L=4} = E\begin{bmatrix} S_{X,i} \\ S_{Y,i} \\ S_{X,N-i+1} \\ S_{Y,N-i+1} \end{bmatrix}.$$

7. The method of claim 6 performed in a transmitter and/or receiver.

8. The method of claim 1 further characterized by inner encoding, with inner code rate L=4, of the form $$D = \frac{1}{\sqrt{2}}\begin{bmatrix} 1 & 1 \\ 1 & -1 \end{bmatrix}, E = D \otimes \begin{bmatrix} 1 & 0 \\ 0 & 1 \end{bmatrix}, S_1 = D\begin{bmatrix} S_{X,i} \\ S_{Y,i} \end{bmatrix},$$

$$S_2 = D\begin{bmatrix} S_{X,N-i+1} \\ S_{Y,N-i+1} \end{bmatrix} \Rightarrow S_{L=4} = E\begin{bmatrix} S_1 \\ S_2 \end{bmatrix}.$$

9. The method of claim 8 performed in a transmitter and/or receiver.

10. The method of claim 1 further characterized by inner encoding, with inner code rate L=4, of the form $$D = \frac{1}{\sqrt{2}}\begin{bmatrix} 1 & 1 \\ 1 & -1 \end{bmatrix},$$

$$\Delta = \begin{bmatrix} e^{-j2\theta} & 0 & 0 & 0 \\ 0 & 1 & 0 & 0 \\ 0 & 0 & e^{-j2\varphi} & 0 \\ 0 & 0 & 0 & 1 \end{bmatrix} \Rightarrow S_{L=4} = \Delta\left(\begin{bmatrix} 1 & 0 \\ 0 & 1 \end{bmatrix} \otimes D\right)\begin{bmatrix} S_{X,i} \\ S_{Y,i} \\ S_{X,N-i+1} \\ S_{Y,N-i+1} \end{bmatrix}.$$

11. The method of claim 10 performed in a transmitter and/or receiver.

12. The method of claim 1 further characterized by inner decoding, with inner code rate L=1, of the form $$Y = [y_1 \ y_2 \ y_3 \ y_4] = \begin{bmatrix} A & B \\ B & A \end{bmatrix} S_{L=1} + v \Rightarrow \begin{bmatrix} y_1 \\ y_2^* \\ y_3^* \\ y_4 \end{bmatrix} = \tilde{S}_{L=1} \begin{bmatrix} S_{X,i} \\ S_{Y,i} \\ S_{X,N-i+1} \\ S_{Y,N-i+1} \end{bmatrix} + v$$

$$\tilde{S}_{L=1} = \begin{bmatrix} a & c & e & g & -b^* & -d^* & -f^* & -h^* & -e^* & -g^* & -a^* & -c^* & f & h & b & d \\ b & d & f & h & a^* & c^* & e^* & g^* & -f^* & -h^* & -b^* & -d^* & -e & -g & -a & -c \\ e & g & a & c & -f^* & -h^* & -b^* & -d^* & a^* & c^* & e^* & g^* & -b & -d & -f & -h \\ f & h & b & d & e^* & g^* & a^* & c^* & b^* & d^* & f^* & h^* & a & c & e & g \end{bmatrix}^T.$$

13. The method of claim 12 further characterized by four-symbol equalization of the form:

$$\tilde{S}_{L=1}^H \begin{bmatrix} y_1 \\ y_2^* \\ y_3^* \\ y_4 \end{bmatrix} = \begin{bmatrix} \hat{S}_{X,i} \\ \hat{S}_{Y,i} \\ \hat{S}_{X,N-i+1} \\ \hat{S}_{Y,N-i+1} \end{bmatrix}.$$

14. The method of claim 13 performed in a transmitter and/or receiver.

15. The method of claim 1 further characterized by inner decoding, with inner code rate L=4, of the form $$y = \begin{bmatrix} A & B \\ B & A \end{bmatrix} S_{L=4} + v \Rightarrow \tilde{y} = Ey = \tilde{S}_{L=4} \begin{bmatrix} S_{X,i} \\ S_{Y,i} \\ S_{X,N-i+1} \\ S_{Y,N-i+1} \end{bmatrix} + \tilde{v}$$

$$\tilde{S}_{L=4} = E \begin{bmatrix} A & B \\ B & A \end{bmatrix} E = \begin{bmatrix} (A+B) & 0 \\ 0 & (A-B) \end{bmatrix}.$$

16. The method of claim 15 further characterized by four-symbol equalization realized using two separate two-symbol equalizations of the form:

$$[A+B] \begin{bmatrix} S_{X,i} \\ S_{Y,i} \end{bmatrix} + \tilde{v}_1$$

$$[A-B] \begin{bmatrix} S_{X,N-i+1} \\ S_{Y,N-i+1} \end{bmatrix} + \tilde{v}_2.$$

17. The method of claim 16 performed in a transmitter and/or receiver.

18. The method of claim 1 further characterized by inner decoding, with inner code rate L=4, of the form $$y = \begin{bmatrix} A & B \\ B & A \end{bmatrix} S_{L=4} + v \Rightarrow \tilde{y} = (I_2 \otimes D) Ey = \tilde{S}_{L=4} \begin{bmatrix} S_{X,i} \\ S_{Y,i} \\ S_{X,N-i+1} \\ S_{Y,N-i+1} \end{bmatrix} + \tilde{v}$$

$$\tilde{S}_{L=4}(I_2 \otimes D) E \begin{bmatrix} A & B \\ B & A \end{bmatrix} E(I_2 \otimes D) = \begin{bmatrix} D^T(A+B)D & 0 \\ 0 & D^T(A-B)D \end{bmatrix}.$$

19. The method of claim 18 further characterized by four-symbol equalization realized using two separate two-symbol equalizations of the form:

$$\begin{bmatrix} a+e+b+f & 0 \\ 0 & a+e-b-f \end{bmatrix} \begin{bmatrix} S_{X,i} \\ S_{Y,i} \end{bmatrix} + \tilde{v}_1$$

$$\begin{bmatrix} a-e+b-f & 0 \\ 0 & a-e-b+f \end{bmatrix} \begin{bmatrix} S_{X,N-i+1} \\ S_{Y,N-i+1} \end{bmatrix} + \tilde{v}_2.$$

20. The method of claim 19 performed in a transmitter and/or receiver.

21. The method of claim 1 further characterized by inner decoding, with inner code rate L=4, of the form $$y = \begin{bmatrix} A_1 & B_1 \\ B_2 & A_2 \end{bmatrix} S_{L=4} + v \Rightarrow \tilde{y} =$$

$$(I_2 \otimes D) \left( \begin{bmatrix} e^{j\theta} & 0 \\ 0 & e^{j\varphi} \end{bmatrix} \otimes I_2 \right) y = \tilde{S}_{L=4} \begin{bmatrix} S_{X,i} \\ S_{Y,i} \\ S_{X,N-i+1} \\ S_{Y,N-i+1} \end{bmatrix} + \tilde{v}$$

$$\tilde{S}_{L=4} = (I_2 \otimes D) \left( \begin{bmatrix} e^{j\theta} & 0 \\ 0 & e^{j\varphi} \end{bmatrix} \otimes I_2 \right) \begin{bmatrix} A_1 & B_1 \\ B_2 & A_2 \end{bmatrix}$$

$$\Delta(I_2 \otimes D) \begin{bmatrix} a+b & 0 & 0 & 0 \\ 0 & a-b & p+q & p-q \\ 0 & 0 & c+d & 0 \\ s+t & s-t & 0 & c-d \end{bmatrix}$$

$$p = g e^{-j\delta} e^{-j2\varphi}$$

$$q = g e^{-j\delta} e^{j2(\theta+\delta)}$$

$$s = f e^{-j\delta} e^{-j2\theta}$$

$$t = f e^{-j\delta} e^{j2(\varphi+\delta)}.$$

22. The method of claim 21 further characterized by four-symbol equalization exploiting the form:

$$(D \otimes I_2) \begin{bmatrix} a+b & 0 & 0 & 0 \\ 0 & a-b & p+q & p-q \\ 0 & 0 & a+b & 0 \\ p+q & p-q & 0 & a-b \end{bmatrix} (D \otimes I_2) =$$

$$\begin{bmatrix} a+b & 0 & 0 & 0 \\ p+q & a+b-b-q & 0 & 0 \\ 0 & 0 & a+b & 0 \\ 0 & 0 & -p-q & a-b-p+q \end{bmatrix}.$$

23. The method of claim 22 performed in a transmitter and/or receiver.

24. The method of claim 1 wherein optical and/or electronic chromatic dispersion compensation is used in conjunction with transmitter and/or receiver side processing to identify and exploit a given channel estimation matrix structure.

25. The method of claim 1 wherein the transmit signals across one or more pairs of sub-carriers and one or more OFDM symbols constitute a codeword of a lattice code.

26. The method of claim 1 further comprising of the feedback of one or more channel estimation matrices from the receiver to the transmitter with the said feedback exploiting the structure of the channel estimation matrices and the transmit signals being responsive to the said feedback.

27. The method of claim 1 further characterized by inner decoding, with inner code rate L=2, of the form $$Y = [y_1 \ y_2]$$
$$= \begin{bmatrix} A & B \\ B & A \end{bmatrix} S_{L=2} + V \Rightarrow z$$
$$= \begin{bmatrix} y_1 \\ y_2^* \end{bmatrix}$$
$$= \tilde{S}_{L=2} \begin{bmatrix} S_{X,i} \\ S_{Y,i} \\ S_{X,N-i+1} \\ S_{Y,N-i+1} \end{bmatrix} + \tilde{v}$$

$$\tilde{S}_{L=2} = \begin{bmatrix} a & c & e & g & -b^* & -d^* & -f^* & -h^* \\ b & d & f & h & a^* & c^* & e^* & g^* \\ e & g & a & c & -f^* & -h^* & -b^* & -d^* \\ f & h & b & d & e^* & g^* & a^* & c^* \end{bmatrix}^T$$

$$\tilde{z} = \tilde{S}_{L=2}^H z =$$

$$\tilde{S}_{L=2}^H \tilde{S}_{L=2} \begin{bmatrix} S_{X,i} \\ S_{Y,i} \\ S_{X,N-i+1} \\ S_{Y,N-i+1} \end{bmatrix} + \hat{v} = \begin{bmatrix} \beta & 0 & \gamma & 0 \\ 0 & \beta & 0 & \gamma \\ \gamma & 0 & \beta & 0 \\ 0 & \gamma & 0 & \beta \end{bmatrix} \begin{bmatrix} S_{X,i} \\ S_{Y,i} \\ S_{X,N-i+1} \\ S_{Y,N-i+1} \end{bmatrix} + \hat{v} \Rightarrow \begin{bmatrix} \tilde{z}_1 \\ \tilde{z}_3 \\ \tilde{z}_2 \\ \tilde{z}_4 \end{bmatrix} =$$

$$\underbrace{\begin{bmatrix} \beta & 0 & \gamma & 0 \\ 0 & \beta & 0 & \gamma \\ \gamma & 0 & \beta & 0 \\ 0 & \gamma & 0 & \beta \end{bmatrix}}_{G} \begin{bmatrix} S_{X,i} \\ S_{Y,i} \\ S_{X,N-i+1} \\ S_{Y,N-i+1} \end{bmatrix} + \begin{bmatrix} \hat{v}_1 \\ \hat{v}_3 \\ \hat{v}_2 \\ \hat{v}_4 \end{bmatrix}.$$

28. The method of claim 27 further characterized by four-symbol equalization realized using two separate two-symbol equalizations of the form:

$$\begin{bmatrix} \tilde{z}_1 \\ \tilde{z}_3 \end{bmatrix} = \underbrace{\begin{bmatrix} \beta & \gamma \\ \gamma & \beta \end{bmatrix}}_{c} \begin{bmatrix} S_{X,i} \\ S_{X,N-i+1} \end{bmatrix} + \hat{v}_1$$

$$\begin{bmatrix} \tilde{z}_1 \\ \tilde{z}_3 \end{bmatrix} = \underbrace{\begin{bmatrix} \beta & \gamma \\ \gamma & \beta \end{bmatrix}}_{c} \begin{bmatrix} S_{Y,i} \\ S_{Y,N-i+1} \end{bmatrix} + \hat{v}_2.$$

29. The method of 28 performed in a transmitter and/or receiver.

* * * * *